United States Patent [19]

Kim et al.

[11] Patent Number: 4,560,539

[45] Date of Patent: Dec. 24, 1985

[54] REMOVAL OF AMMONIA FROM SODIUM TUNGSTATE SOLUTIONS

[75] Inventors: Tai K. Kim, Towanda; Robin W. Munn, Sayre; Carl W. Boyer, Wyalusing; Martin C. Vogt, Monroeton, all of Pa.

[73] Assignee: GTE Products Corporation, Stamford, Conn.

[21] Appl. No.: 690,549

[22] Filed: Jan. 11, 1985

[51] Int. Cl.$^4$ .............................................. C01G 41/00
[52] U.S. Cl. ...................................... 423/59; 423/53; 423/61
[58] Field of Search ...................... 423/53, 59, 61, 593

[56] References Cited

U.S. PATENT DOCUMENTS 2,893,832  7/1959  Loung .................................. 423/593
4,311,679  1/1982  Queneau et al. ....................... 423/53

Primary Examiner—H. T. Carter
Attorney, Agent, or Firm—Donald R. Castle

[57] ABSTRACT

A process is disclosed for removing ammonia from a sodium tungstate solution. The process involves heating the solution at from about 80° C. to about 95° C., while at the same time maintaining the pH above about 9.4 by addition of sodium hydroxide to the sodium tungstate solution. The heating is carried out for a period of time sufficient to allow the essentially complete removal of the ammonia.

2 Claims, No Drawings

REMOVAL OF AMMONIA FROM SODIUM TUNGSTATE SOLUTIONS

FIELD OF THE INVENTION

This invention relates to the removal of ammonia from sodium tungstate solutions.

BACKGROUND OF THE INVENTION

In tungsten chemical processing, impure sodium tungstate solutions are generally obtained by caustic digestion of tungsten ores. The impure sodium tungstate solutions are subjected to arsenic, phosphorus and silica removal. This removal process can involve the addition of magnesium chloride and ammonium hydroxide to the sodium tungsten solutions to precipitate the named impurities. The resulting purified sodium tungstate solutions contain relatively high ammonia concentrations. During subsequent processing, the pH of the sodium tungstate solutions is adjusted to about 3.5 from about 9.4 before removing molybdenum. During this pH adjustment, insoluble sodium ammonium paratungstate double salts can form in solutions of relatively high ammonia concentrations. Also, the ammonia in the sodium tungstate ends up in the waste streams and causes pollution problems.

Therefore, a process to remove ammonia from the sodium tungstate solutions would be highly desirable.

SUMMARY OF THE INVENTION

In accordance with one aspect of this invention, there is provided a process for removing ammonia from a sodium tungstate solution. The process involves heating the solution at from about 80° C. to about 95° C., while at the same time maintaining the pH above about 9.4 by addition of sodium hydroxide to the sodium tungstate solution. The heating is carried our for a period of time sufficient to allow the essentially complete removal of ammonia.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This invention relates to a process for removing ammonia from a sodium tungstate solution.

To effectively remove the ammonia, the sodium tungstate solution is heated at from about 80° C. to about 95° C. with from about 82° C. to about 92° C. being preferred; and it is preferable that the solution be agitated. The pH of the solution is generally at from about 8.5 to about 9.4. As ammonia gas is removed, the pH begins to drop. In order to effect the essentially complete removal of the ammonia gas, the pH is maintained above about 9.4. This is done by adding sodium hydroxide as necessary. The sodium hydroxide can be added in any convenient form, that is, as the solid or in solution. It is preferable that the sodium hyroxide be added as a solution having a concentration of from about 10N to about 20N and that it be added relatively slowly for better control of the pH adjustment.

It is preferable that the solution be allowed to decrease in volume during the heating in order to increase surface area and more effectively remove the ammonia gas. The decrease in volume of the solution should not be to the degree that the solubility of tungsten is exceeded. Generally a decrease in volume of from about 13% to about 45% is preferred.

The heating is carried out until the ammonia removal is essentially complete as indicated by using test paper for ammonia (CARLD ERBA). In the presence of ammonium ion, the paper becomes yellowish brown and in the absence of ammonium ion, the paper remains white. Regular pH paper can be used and if ammonia still remains, the paper will indicate a basic pH.

It is obvious to those skilled in the art that the length of time depends on factors as the volume of the solution, size and dimensions of the holding vessel, heating temperature, amount of ammonia to be removed, degree of agitation, and the like. Generally times are from about 1 hour to about 6 hours, and preferably from about 2 hours to about 5 hours.

To more fully illustrate this invention, the following non-limiting examples are presented. All parts, portions, and percentages by weight unless otherwise states.

EXAMPLE 1

About 250 parts by volume of sodium tungstate solution containing ammonia is stirred and heated to about 90° C. for varying lengths of time. The volume of the sodium tungstate solution is kept constant by adding water. A sodium hydroxide solution of about 10 Normal is added slowly to maintain a pH of greater than about 9.4. The results are given in Table 1.

TABLE 1

| DIGESTION TIME HOURS | pH OF SODIUM TUNGSTATE SOLUTION | | NH3 CONCENTRATION g/l | | PERCENT NH3 REMOVAL |
|---|---|---|---|---|---|
| | Start | Finish | Start | Finish | |
| 2.0 | 9.4 | 11.8 | 12.8 | 0.12 | 99.1 |
| 5.0 | 9.4 | 12.0 | 12.8 | 0.01 | 99.9 |
| 2.5 | 9.4 | 8.0 | — | — | precipitate form |

EXAMPLE 2

The procedure in Example 1 is followed except that the volume is not kept constant during the ammonia removal process. Results are given in Table 2.

TABLE II

| DIGESTION HOURS | pH OF SODIUM TUNGSTATE SOLUTION | | VOLUME OF SODIUM TUNGSTATE SOLUTION ml | | NH3 CONCENTRATION g/l | | PERCENT NH3 REMOVAL |
|---|---|---|---|---|---|---|---|
| | Start | Finish | Start | Finish | Start | Finish | |
| 1 | 10.0 | 8.5 | 1,000 | 800 | 5.5 | 1.3 | 81.1 |
| 1 | 10.5 | 9.0 | 500 | 300 | 4.6 | 0.23 | 97.5 |
| 1 | 10.0 | 10.0 | 800 | 600 | 1.3 | 0.02 | 98.9 |

EXAMPLE 3

Various volumes of a sodium tungstate solution are added to a 2500 gallon size tank. The temperature of the solution is heated to about 82° C. Sodium hydroxide solution of about 19 normal is added to maintain the pH above about 9.4. The heating is carried out from about 2 to about 6 hours. Results are given in Table 3.

TABLE III

| TEST | TUNGSTEN SOLUTION GALLON | SODIUM HYDROXIDE GALLON | TIME HOURS | pH OF SODIUM TUNGSTEN SOLUTION | | CONCENTRATION g/l | | PERCENT NH$_3$ REMOVAL |
|---|---|---|---|---|---|---|---|---|
| | | | | Start | Finish | Start | Finish | |
| 1. | 1050 | 15 | 2 | 10.5 | 9.8 | 2.4 | 0.89 | 62.9 |
| | | | 6 | 10.5 | 9.7 | 2.4 | 0.07 | 97.9 |
| 2. | 1627 | 23 | 2 | 10.4 | 9.8 | 3.7 | 1.7 | 54.1 |
| 3. | 2150 | 30 | 2 | 10.4 | 10.4 | 3.6 | 3.6 | 0.0 |
| | | | 6 | 10.4 | 10.2 | 3.6 | 2.7 | 25.0 |

The results of the above operations indicate that ammonia removal generally is more efficient at the higher pH's and longer heating times.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for removing ammonia from a sodium tungstate solution said process comprising heating said sodium tungstate solution at from about 80° to about 95° C. while at the same time maintaining the pH above about 9.4 by addition of sodium hyroxide to said sodium tungstate solution, the heating being carried out for a sufficient time to allow for the essentially complete removal of said ammonia.

2. A process according to claim 1 wherein the heating is carried for from about 1 hour to about 6 hours.

* * * * *